(12) United States Patent
Lutz

(10) Patent No.: US 7,871,232 B2
(45) Date of Patent: Jan. 18, 2011

(54) LINE FEED SYSTEM WITH INDEXING CART

(76) Inventor: David W. Lutz, 1223 Dickenson Dr., Carlisle, PA (US) 17013

(*) Notice: Subject to any disclaimer, the term of this patent is extended or adjusted under 35 U.S.C. 154(b) by 1197 days.

(21) Appl. No.: 11/431,419

(22) Filed: May 10, 2006

(65) Prior Publication Data

US 2006/0280580 A1 Dec. 14, 2006

Related U.S. Application Data

(60) Provisional application No. 60/680,183, filed on May 12, 2005, provisional application No. 60/740,333, filed on Nov. 29, 2005.

(51) Int. Cl.
*B65G 1/00* (2006.01)

(52) U.S. Cl. .................. 414/279; 414/280; 414/282; 198/463.3

(58) Field of Classification Search ............. 414/279, 414/280, 282; 198/456, 463.3
See application file for complete search history.

(56) References Cited

U.S. PATENT DOCUMENTS

| | | | | |
|---|---|---|---|---|
| 3,848,755 A | * | 11/1974 | Bussienne et al. | 414/279 |
| 5,002,449 A | * | 3/1991 | Kita et al. | 414/273 |
| 5,411,360 A | * | 5/1995 | Hilliker et al. | 414/608 |
| 5,927,926 A | * | 7/1999 | Yagi et al. | 414/280 |
| 6,168,366 B1 | * | 1/2001 | Horn | 414/416.03 |
| 6,199,490 B1 | * | 3/2001 | Langer | 108/143 |
| 6,652,213 B1 | * | 11/2003 | Mitchell et al. | 414/284 |
| 6,769,536 B2 | * | 8/2004 | Lutz | 198/861.1 |
| 6,929,440 B1 | * | 8/2005 | Grond | 414/284 |

* cited by examiner

*Primary Examiner*—Saúl J Rodríguez
*Assistant Examiner*—Jonathan D Snelting
(74) *Attorney, Agent, or Firm*—The Webb Law Firm

(57) ABSTRACT

A line feed system of the invention comprises a framework having a first end and a second end. At least one conveyor is carried on the framework. The conveyor comprises a drive system and a cart configured to engage the drive system. In one embodiment, the cart has a base that engages the drive system and a carriage that is movable, e.g., extensible and retractable, with respect to the base. In another embodiment, the drive system is extensible and retractable. The cart can also include one or more lift devices that can be raised and lowered with respect to the carriage.

6 Claims, 12 Drawing Sheets

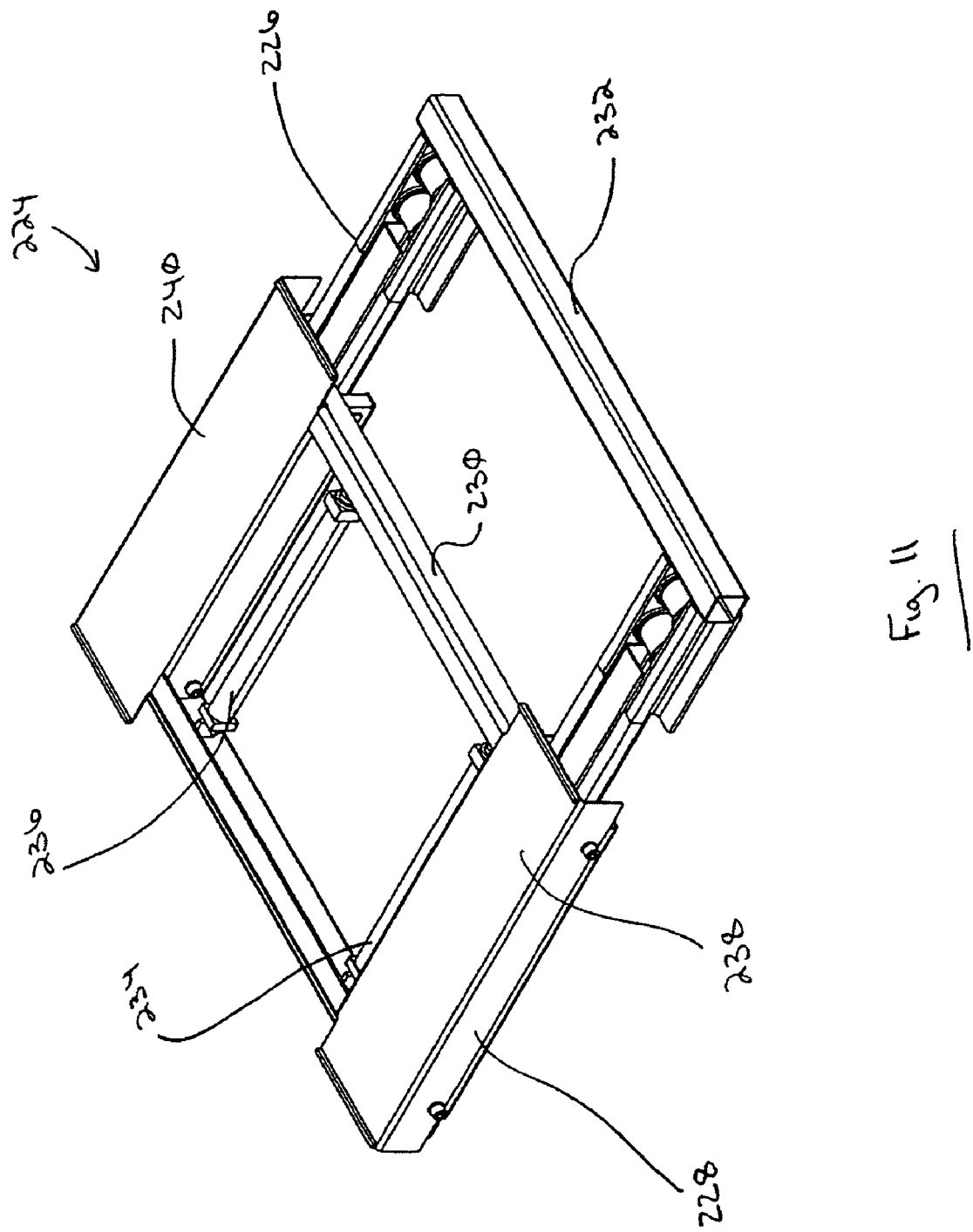

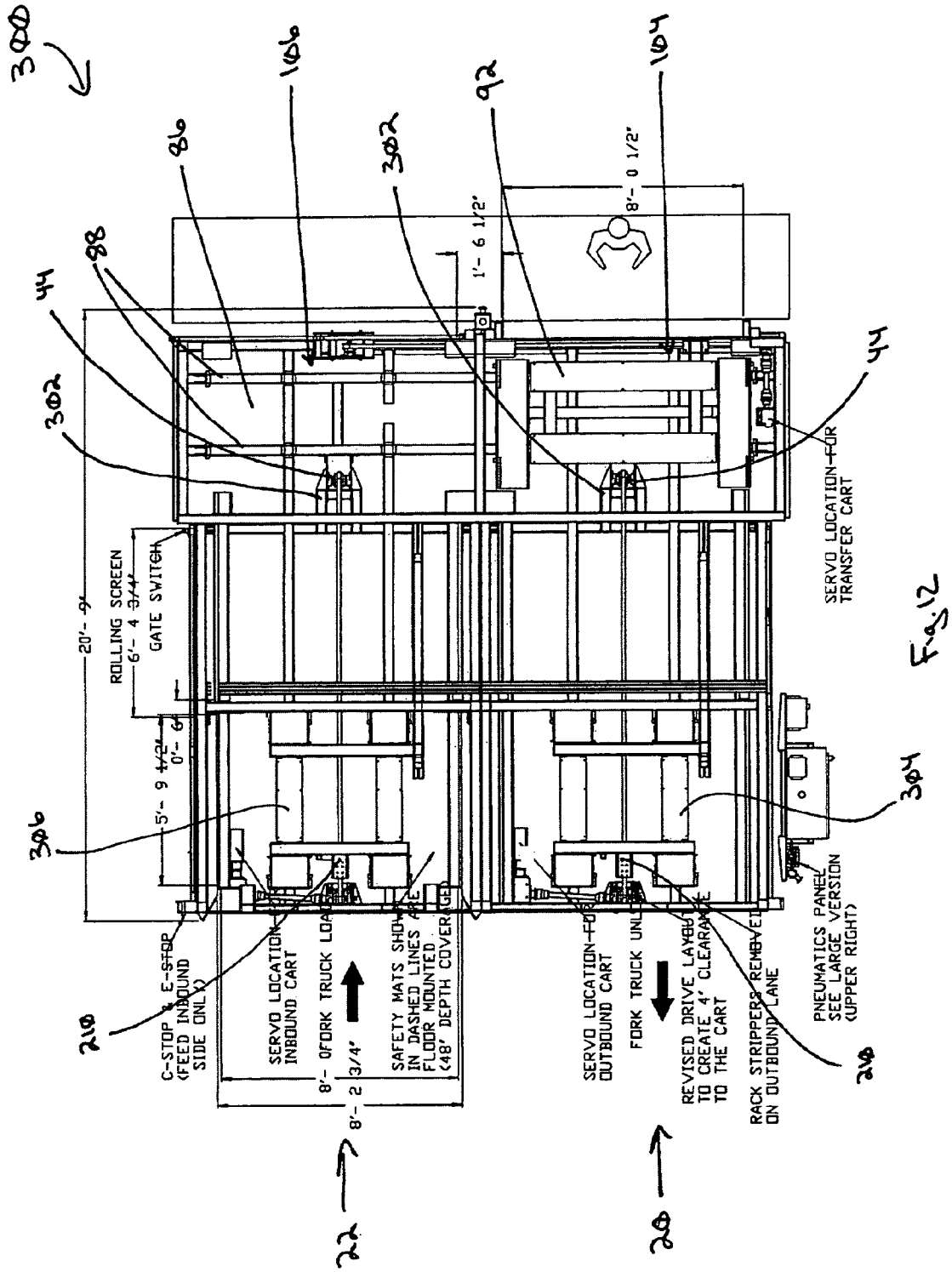

LINE FEED SYSTEM WITH INDEXING CART

CROSS REFERENCE TO RELATED APPLICATIONS

This application claims the benefits of U.S. Provisional Patent Application Ser. No. 60/680,183, filed May 12, 2005, and U.S. Provisional Patent Application Ser. No. 60/740,333, filed Nov. 29, 2005, both of which applications are herein incorporated by reference in their entirety.

BACKGROUND OF THE INVENTION

1. Field of the Invention

The present invention relates generally to line feed systems and, more particularly, to line feed systems to handle and transport containers or racks containing manufacturing components.

2. Description of the Currently Available Technology

An ongoing need in industrial applications that utilize a production line is to provide an efficient and inexpensive way of delivering parts to a worker on the production line. In the automotive industry, for example, a worker on the production line requires a large number of individual parts to be delivered in a timely and uninterrupted manner. These parts are typically placed in a rack or container and delivered to the worker via a conveyor system. In order to facilitate parts delivery, automated line feed systems have been developed. Examples of known automated line feed systems include so-called over/under line feed systems (in which one conveyor is located under another conveyor) or side-by-side line feed systems (in which one conveyor is located adjacent to another conveyor).

In order to move the containers or racks containing the parts along the conveyors, some conventional automated line feed systems utilize an indexing rail system in which indexing rails extend along the length of the conveyor path. To move or index a rack along the conveyor, these indexing rails are activated to lift and move a rack a finite distance with each cycle of the indexing rails. In order to move a rack along the length of the conveyor, the indexing rails must be cycled numerous times.

Other known automated line feed systems utilize carts having driven wheels. However, these wheel-driven carts also have disadvantages. For example, the wheels can slip or lose traction if the cart is accelerated or decellerated too quickly.

While these known line feed systems are adequate for their intended use, it would be advantageous to provide an automated line feed system having a simpler and more efficient transportation means to move racks along the conveyor. Particularly, it would be advantageous to provide an automated line feed system having a conveyor system with which a rack could be transported any distance along the conveyor path and not just a fixed, finite amount. It would also be advantageous to provide an automated line feed system having a cart that could be accelerated and decelerated to a greater degree than known carts without the problems of slipping and loss of traction associated with known carts.

SUMMARY OF THE INVENTION

A line feed system of the invention comprises a framework having a first end and a second end. At least one conveyor is carried on the framework. The conveyor comprises a drive system and a cart configured to engage the drive system. At least a portion of the cart is extensible beyond an end of the framework. In one embodiment, the cart has a base that engages the drive system and a carriage that is movable, e.g., extensible and retractable, with respect to the base. In another embodiment, the drive system can be configured to selectively extend beyond an end of the framework. For example, the drive system could include an arm that is movable, e.g., pivotable or extensible and retractable, such that the drive system could be selectively extended or retracted. Alternatively, the entire drive system could be movable with respect to the framework. In another embodiment, a portion of the drive system can permanently extend beyond the end of the framework. The cart can also include one or more lift devices that can be raised and lowered with respect to the carriage.

An over/under line feed system of the invention comprises a framework having a first end and a second end, a first conveyor located under a second conveyor on the framework, a first cart movable along the first conveyor, and a second cart movable along the second conveyor. An elevator assembly is located adjacent the first end of the framework. The elevator assembly includes a lifting carriage. A first drive system is associated with the first conveyor and a second drive system is associated with the second conveyor. In one embodiment, the first and second carts each include a base, a cart carriage, and a movement device configured to move the cart carriage with respect to the cart base such that the cart carriage is extensible into the lift carriage of the elevator when the lift carriage is adjacent the first end of one of the conveyors. In another embodiment, the drive systems can be configured to selectively extend beyond an end of the framework. For example, the drive systems (or at least a portion thereof) could be movable, e.g., pivotable or extensible and retractable, such that the drive systems could be selectively extended or retracted into or out of the lift carriage when the lift carriage is adjacent the first end of one of the conveyors.

A side-by-side line feed system of the invention comprises a first conveyor located adjacent a second conveyor. Each of the first and second conveyors comprises a drive system and a cart configured to engage the drive system. In one embodiment, each cart includes a base configured to engage the drive system and a carriage movable, e.g., extensible and retractable, with respect to the base. In another embodiment, the drive systems can be configured to selectively extend beyond an end of their respective conveyors. For example, the drive systems (or at least a portion thereof) could be movable, e.g., pivotable or extensible and retractable, such that the drive systems could be selectively extended or retracted. In a further embodiment, a portion of the drive system can permanently extend beyond the end of the framework. A transfer conveyor is located adjacent the first ends of the first and second conveyors and extends substantially perpendicularly to the first and second conveyors.

BRIEF DESCRIPTION OF THE DRAWINGS

A complete understanding of the invention will be obtained from the following description when taken in conjunction with the accompanying drawing figures, wherein like reference symbols identify like parts throughout.

FIG. 11 is another indexing cart incorporating features of the invention; and

FIG. 12 is a plan view of another side-by-side line feed system of the invention.

DESCRIPTION OF THE PREFERRED EMBODIMENTS

Figure 1:
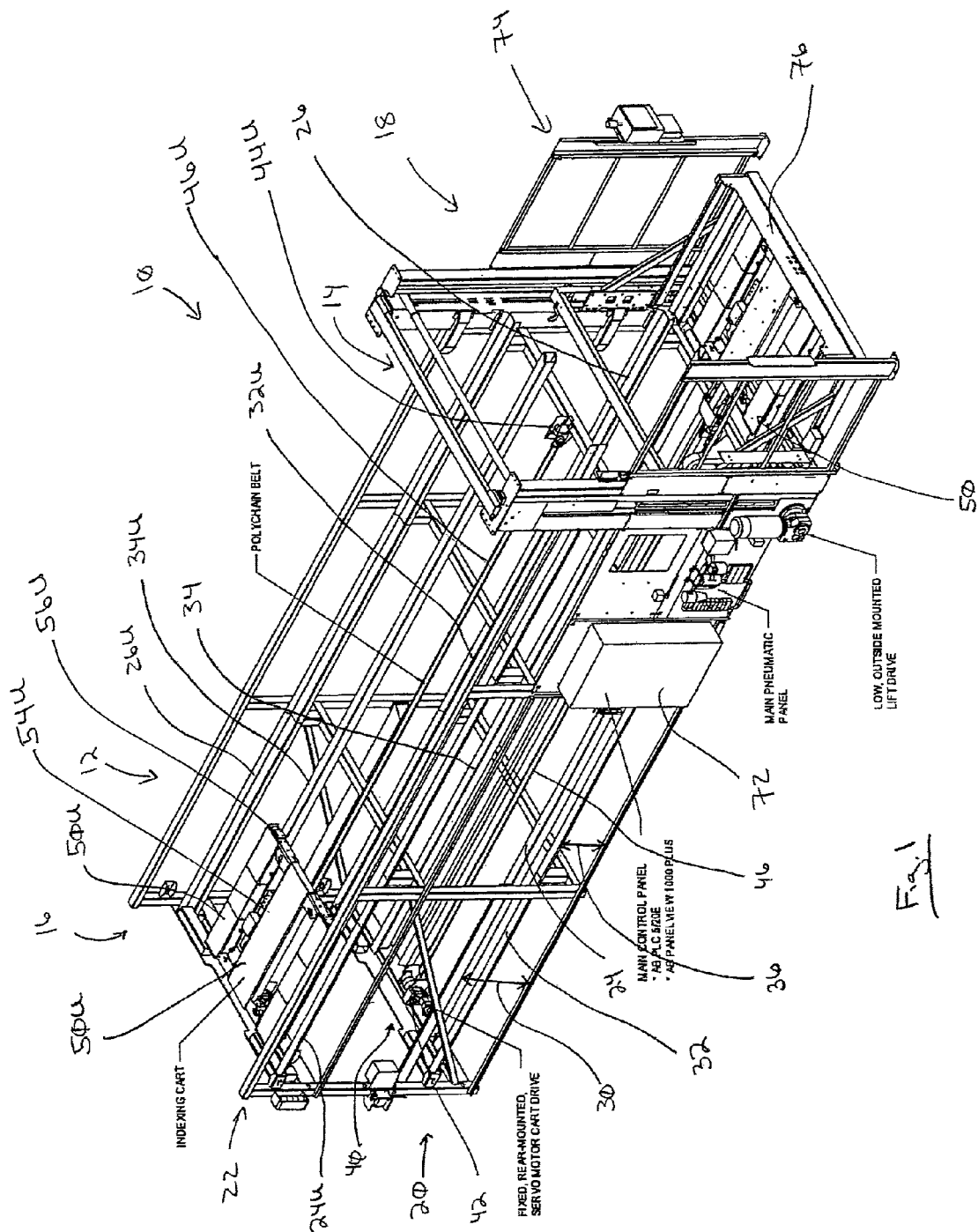
FIG. 1 is a perspective view of an over/under line feed system incorporating features of the invention.

As used herein, spatial or directional terms, such as "top", "bottom", "left", "right", "over", "under", "front", "rear", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification, figures, and claims are to be understood as being modified in all instances by the term "about". Accordingly, unless indicated to the contrary, the numerical values set forth in the following specification, figures, and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. The dimensions set forth on the accompanying drawing figures are for one exemplary embodiment of the invention and it is to be understood that the invention is not limited to the specifically disclosed dimensions. All references referred to herein are to be understood to be incorporated by reference in their entirety.

The invention will be described first with respect to use with an over/under line feed system and then with respect to a side-by-side line feed system. However, it is to be appreciated that these are simply exemplary embodiments to describe the general principles of the invention and that the invention is not limited to these specifically disclosed embodiments.

Figure 2:
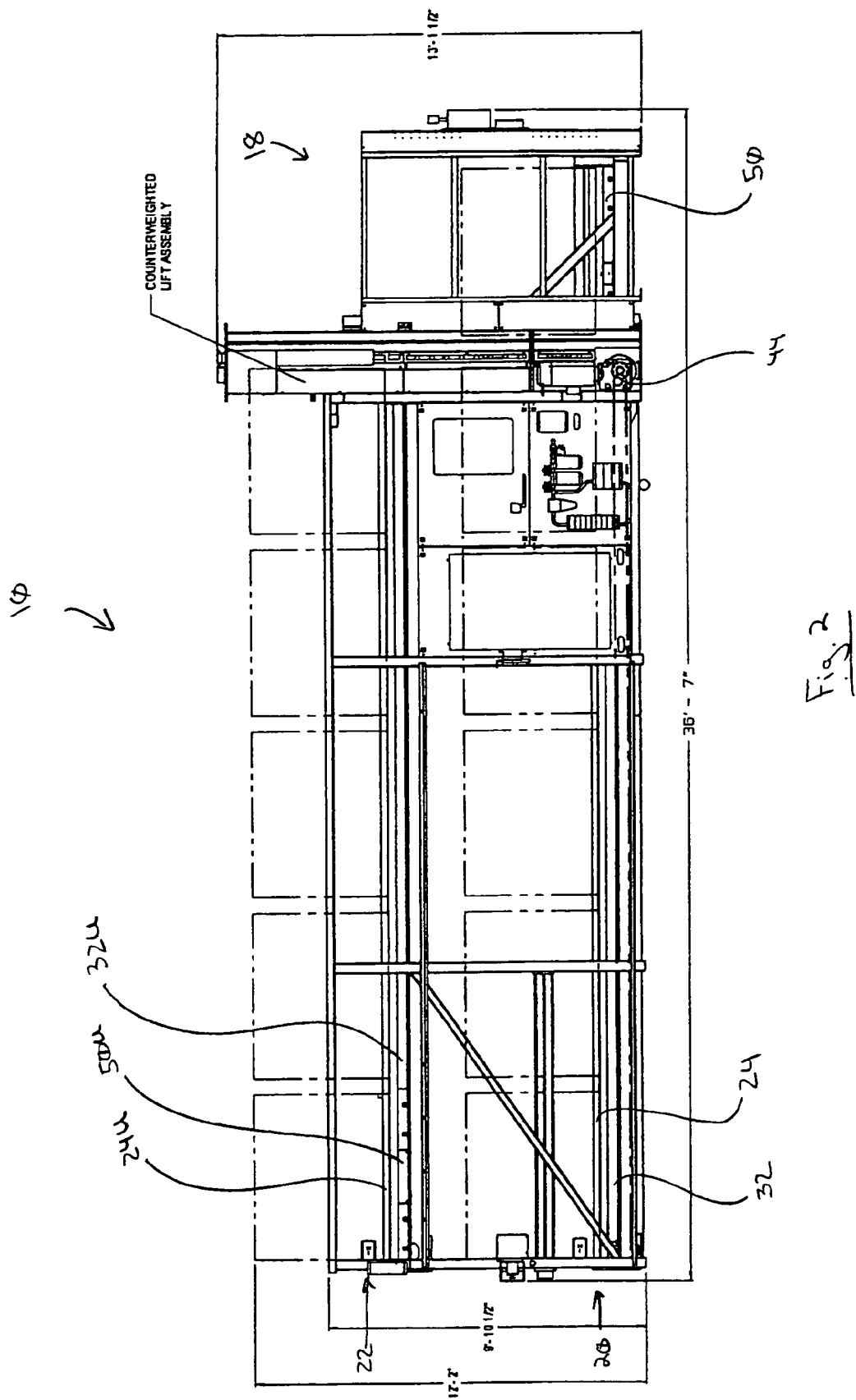
FIG. 2 is a side view of the over/under line feed system of FIG. 1.
Figure 3:
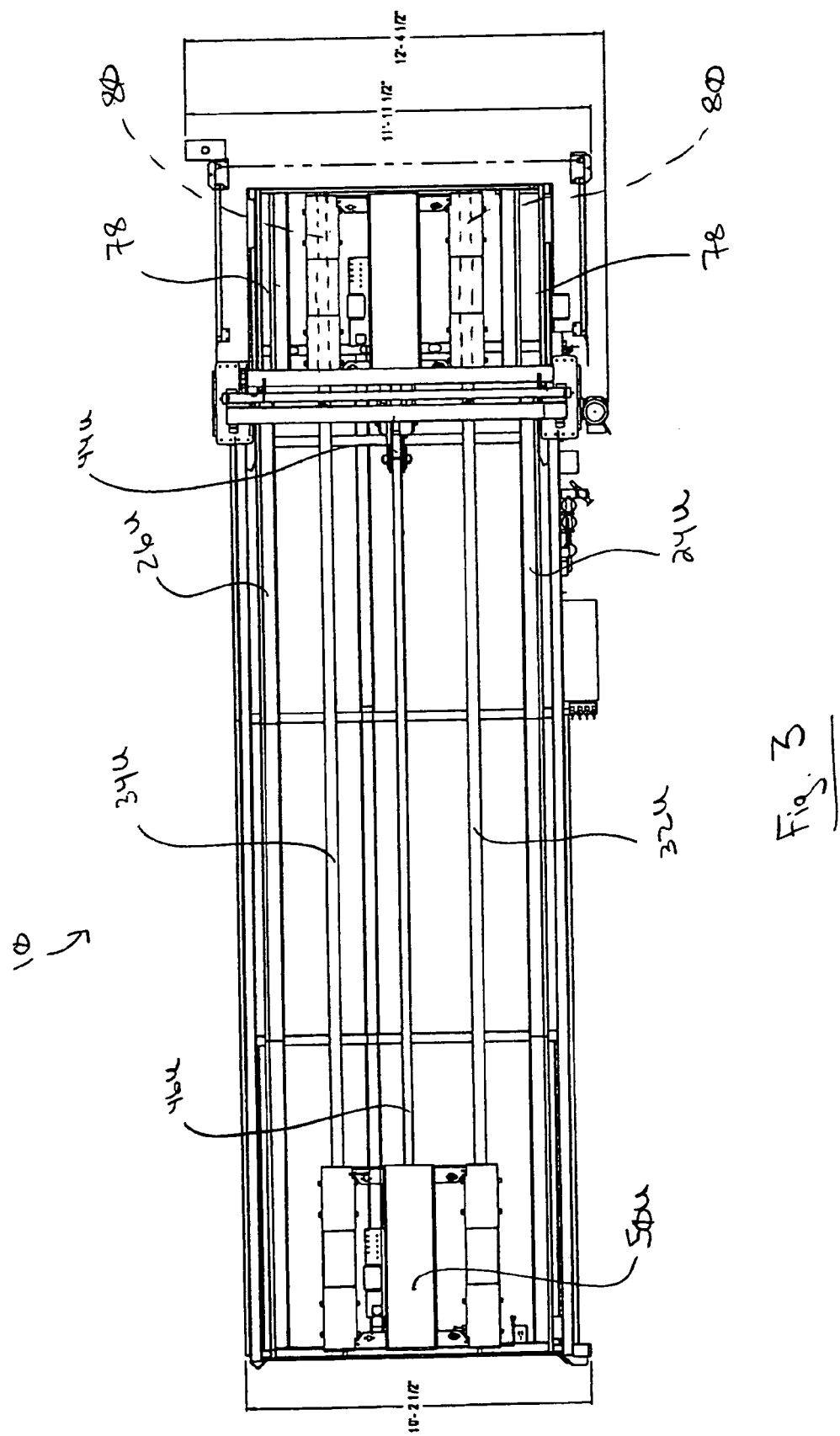
FIG. 3 is a plan view of the over/under line feed system of FIG. 1.

An over/under line feed system 10 is shown in FIGS. 1-3. The over/under line feed system 10 includes a main framework 12 having a first (front) end 14 and a second (rear) end 16. An elevator assembly 18 is located at or adjacent the first end 14 of the framework 12.

In one embodiment, the framework 12 can be a substantially rectangular and rigid metal framework including a plurality of spaced vertical support legs, cross members, and braces. The structure of such a conventional rigid framework 12 will be well understood by one of ordinary skill in the art and, hence, will not be described in detail. In another embodiment, the framework 12 (and optionally the elevator assembly 18) can be an adjustable structure as described, for example, in U.S. Pat. No. 6,769,536, herein incorporated by reference.

The framework 12 defines a first (lower) conveyor 20 and a second (upper) conveyor 22. Looking first at the lower conveyor 20, the framework 12 includes a pair of spaced rack support rails 24, 26 running along the sides of the conveyor path. In the illustrated embodiment, the rack support rails 24, 26 are attached to the inner sides of the framework 12 and include an upper support surface configured to hold a rack, as described in more detail below. The support rails 24, 26 can be of any desired material, such as but not limited to metal, for example, steel or aluminum. The support rails 24, 26 of the lower conveyor 20 are located at a first vertical height 30 on the framework 12.

The conveyor 20 includes a pair of spaced cart rails 32, 34 configured to support and guide an indexing cart, as described in more detail below. The cart rails 32, 34 are positioned inside the rack support rails 24, 26 and are positioned at a second vertical height 36 that is less than the first vertical height 30 of the rack support rails 24, 26. That is, the cart rails 32, 34 are lower (closer to the ground) than the rack support rails 24, 26.

A drive assembly 40 is located on or in the framework 12. In the illustrated embodiment, the drive assembly 40 includes a fixed motor drive 42 attached at or near the second end 16 of the framework 12. An idler wheel 44 (FIG. 2) or gear is attached or near the first end 14 of the framework 12. A flexible, toothed drive belt 46 is engaged around the motor drive 42 and idler 44 such that rotation of the motor drive 42 causes the drive belt 46 to rotate around the idler wheel 44. It is to be understood that this is simply one exemplary drive assembly that could be utilized in the practice of the invention. Other conventional drive assemblies, such as but not limited to chains, ropes, cables, or screw drives could be utilized.

Figure 4:
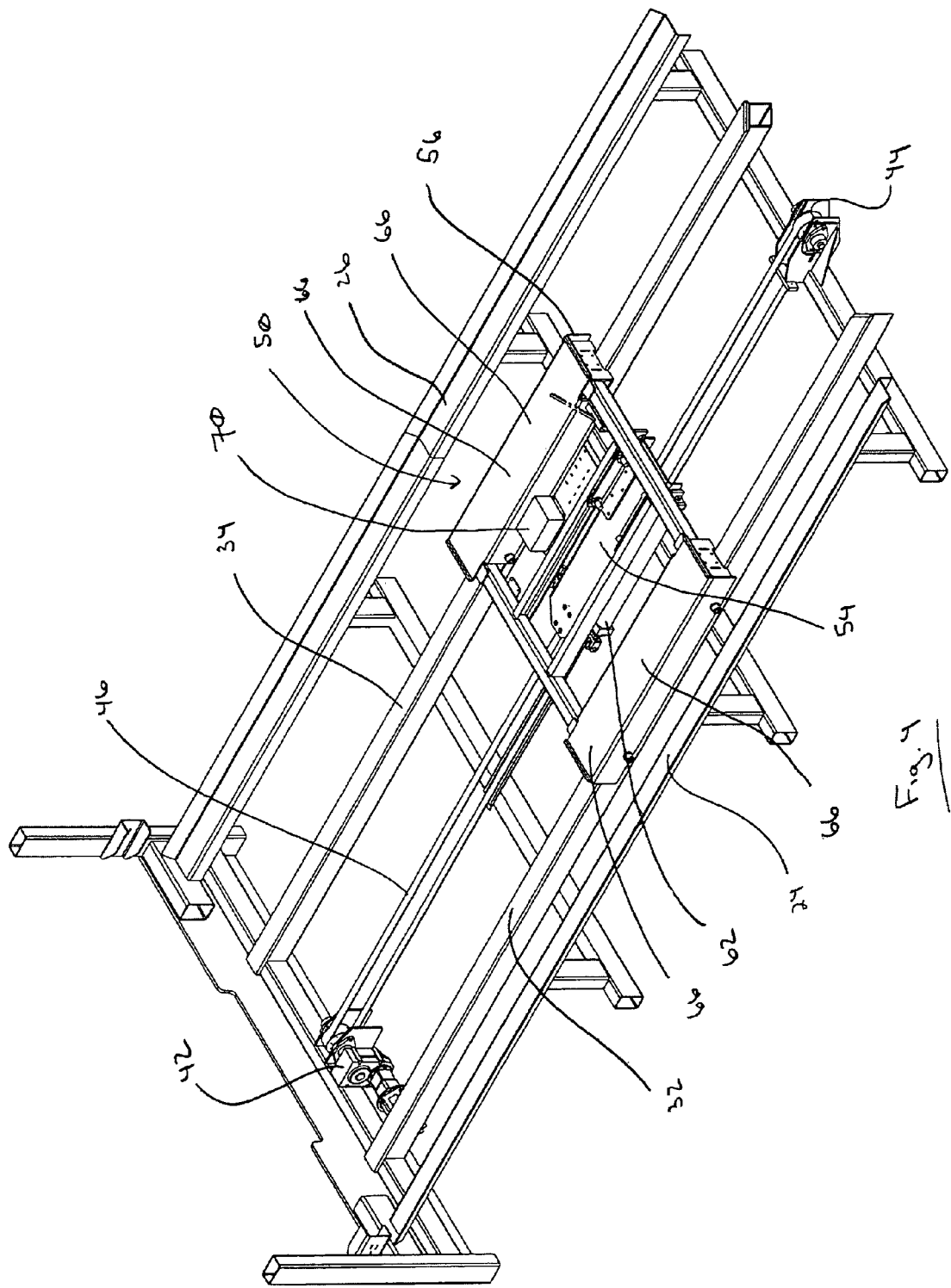
FIG. 4 is a perspective view of a portion of a conveyor showing an indexing cart of the invention having a carriage in a first (non-extended) position.
Figure 5:
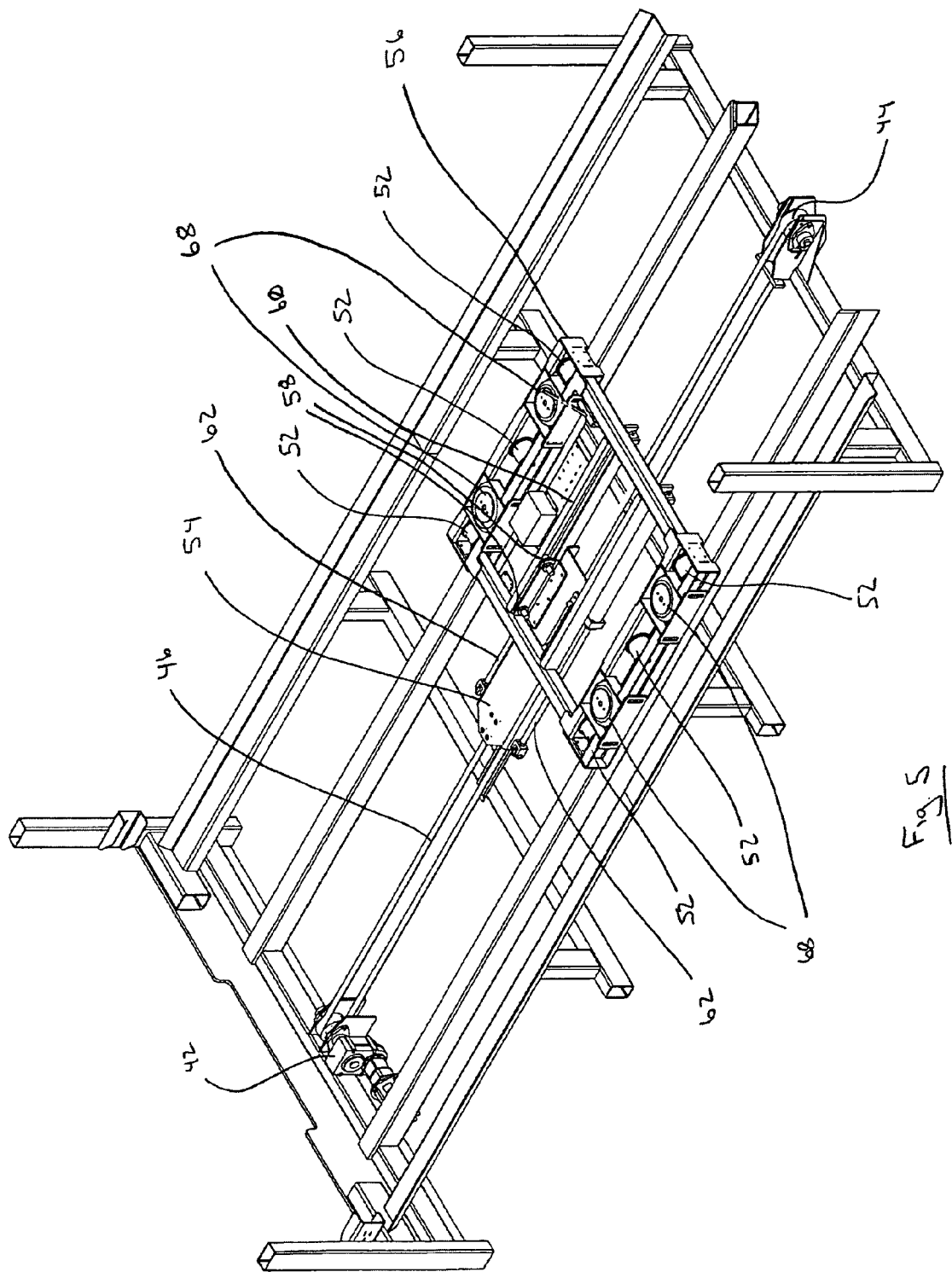
FIG. 5 is a perspective view of the cart of FIG. 4 showing the carriage in a second (extended) position with parts removed for ease of discussion.

As shown in FIGS. 4 and 5, a cart 50 of the invention is configured to ride on the cart rails 32, 34. For example, the cart 50 can include spaced wheels 52 (see FIG. 5) configured to engage the top and/or sides of the cart rails 32, 34. As shown particularly in FIGS. 4 and 5, the cart 50 includes a base 54 configured to engage the drive belt 46. For example, the base 54 can include a pulley with slots configured to engage teeth on the drive belt 46 such that movement of the drive belt 46 pulls the cart 50 along the cart rails 32, 34. The cart 50 further includes a carriage 56 movably mounted on the base 54. In the illustrated embodiment (FIG. 5), the base 54 has a pair of spaced wheels 58 located on each side of the base 54. The carriage 56 has a pair of spaced tracks 60 configured to engage the wheels 58 on the base 54. The carriage 56 is connected to the base 54 by one or more movement assemblies such that the carriage 56 is movable (e.g., extensible and retractable) with respect to the base 54. In the illustrated embodiment, the movement assemblies are illustrated as conventional piston/cylinder assemblies 62. FIG. 4 shows the carriage 56 in a first (non-extended) position with the piston/cylinders 62 retracted and FIG. 5 shows the carriage 56 in an extended position (with the piston/cylinders 62 extended).

Figure 6:
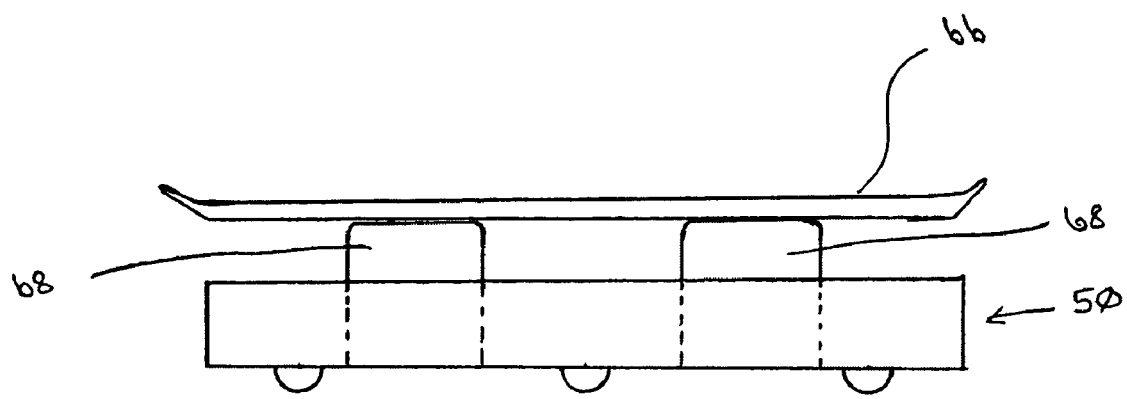
FIG. 6 is a side view of the cart of FIG. 4 showing a lift platform in a raised position.

The carriage 56 further includes one or more lift assemblies. For example, the lift assemblies can include one or more lift platforms 66 configured to be raised and lowered by one or more lift devices. In the illustrated embodiment, the carriage 56 includes two lift assemblies located on each side of the carriage 56. Each lift assembly includes a lift platform 66 and a pair of spaced pneumatic lift bags 68 configured to raise and lower the lift platforms 66. FIG. 4 shows the lift platforms 66 in a lowered position (i.e., lift bags 68 deflated) and FIG. 6 shows the lift platforms 66 in a raised position (i.e., lift bags 68 inflated). While in the illustrated embodiment pneumatic lift bags are utilized to raise and lower the lift platforms 66, it is to be understood that the invention is not limited to use with pneumatic lift bags. For example, the lift devices to raise and lower the lift platforms 66 could be of any conventional type, such as but not limited to mechanical screws, scissors-type lifting mechanisms, hydraulic jacks, electrical lifting arms, or hydraulic lifting cylinders, just to name a few.

The cart 50 further includes a cart control device 70 to control operation of the lift devices (lift bags 68) and piston/cylinder assemblies 62. This cart control device 70 can be connected to an electrical or other control system 72 (FIG. 1) in any conventional manner, such as by a flexible cable contained within a flexible track (not shown).

The second (upper) conveyor 22 is similar in structure to the lower conveyor 20 described above and the components of the second conveyor 22 illustrated in FIGS. 1-3 are labeled by the same reference numerals as the corresponding components in the first conveyor 20 but include the designation "U" after the reference number.

The elevator assembly 18 includes a metal framework 74 having a lift carriage 76 vertically movable from the first end of the first conveyor 20 to the first end of the second conveyor 22. The elevator framework 74 can include upright metal supports and cross supports, as will be well understood by one skilled in the art. The framework 74 can be a rigid metal structure as is known in the art or can be an adjustable structure as described, for example, in U.S. Pat. No. 6,769,536. The lift carriage 76 includes a pair of rack support segments 78 and a pair of cart rail segments 80 that align with the rack support rails 24, 26; 24U, 26U and cart rails 32, 34; 32U, 34U when the lift carriage 76 is positioned at the first end of one of the conveyors 20, 22. The lift carriage 76 is movable between a first or lowered positioned in which the lift carriage 76 is positioned adjacent the first end of the lower conveyor 20 and a second or upper position in which the lift carriage is positioned adjacent the first end of the upper conveyor 22. The lift carriage 76 can be movable in any conventional manner, such as but not limited to conventional hydraulic or pneumatic lift cylinders.

In another embodiment, the carriage 56 could be non-movably attached to the base 54 but the drive assembly 40 could be configured to be movable, e.g., extensible and retractable. For example, the idler wheel 44 could be carried on an arm or similar structure and could be pivotable or movable to selectively extend or retract the idler wheel 44, and hence increase or decrease the length of the drive track. Alternatively, the drive assembly 40 itself could be movable. For example, the drive assembly 40 could be mounted on a track and could be movable, e.g., extensible and retractable, with respect to the framework 12.

Operation of the over/under line feed system 10 will now be described.

With both conveyors 20, 22 empty, a rack containing one or more parts to be delivered to the work station can be loaded onto the second end of the lower conveyor 20 in any conventional manner. For example, the rack can be positioned onto the rack support rails 24, 26 at the second end of the lower conveyor 20 by a conventional fork lift truck. The cart 50 is moved by the drive assembly 40 to the second end of the conveyor 20. Since the cart rails 32, 34 are lower than the rack support rails 24, 26, the cart 50 moves under the rack. The pneumatic lift bags 68 are activated to raise the lift platforms 66 to engage and then lift the rack off of the rack support rails 24, 26. Thus, in this position, the rack is completely supported on the cart 50 and the bottom of the rack is above the rack support rails 24, 26. The drive assembly 40 is then engaged to move the cart 50 (and the rack supported thereon) toward the first end of the conveyor 20. In order to position the rack in the lift carriage 76, when the cart 50 is at or near the first end of the conveyor 20, the pneumatic cylinders 62 are extended. This pushes the cart 50 from the cart rails 32, 34 of the conveyor 20 onto the cart rail segments 80 in the lift carriage 76, moving the rack into the lift carriage 76. The pneumatic lift bags 68 are deflated, lowering the rack onto the rack support segments 78 of the lift carriage 76. The pneumatic cylinders 62 are retracted drawing the cart 50 back into the framework 12 and onto the cart rails 32, 34. While an operator is removing the part or parts from the rack on the lift carriage 76, the cart 50 can again be moved to the rear of the conveyor 20 and another rack loaded onto the rack support rails 24, 26. The cart 50 can then transport this second rack to the first end of the conveyor 20 to a position (Zone 1) directly to the rear of the lift carriage 76 and then move back to the rear of the conveyor 20 to move a third rack to a position (Zone 2) to the rear of the second rack. In this manner, a plurality of racks containing parts can be positioned all along the length of the conveyor 20 at different positions or "Zones" defined along the conveyor 20.

When the rack in the lift carriage 76 is empty, the operator can raise the lift carriage 76 from the lowered position to the upper position adjacent the first end of the second conveyor 22. The upper cart 50U is moved to the first end of the second conveyor 22 and the pistons/cylinders 62 extended to move the cart 50U onto the cart rail segments 80 of the lift carriage 76 and under the empty rack. The lift bags 68 are inflated to raise the empty rack off of the rack support segments 78 and then the piston/cylinders 62 are retracted to move the cart 50U (and the empty rack resting thereon) onto the cart rails 32U, 34U of the second conveyor 22. The cart 50U can transport the rack to the second end of the conveyor 22 where the pneumatic lift devices 68 are deflated and the empty rack thus rests on the rack support rails 24U, 26U at the second end of the upper conveyor 22. The empty rack can be removed in any conventional manner, such as by a fork lift or overhead crane system.

The empty lift carriage 76 can be lowered adjacent the first end of the lower conveyor 20. The lower cart 50 is positioned under the rack at the first end (Zone 1) of the conveyor 20 and the pneumatic lift bags 68 are activated to raise this rack. The piston/cylinders 62 are extended to guide the cart 50 (and the rack carried thereon) into the lift carriage 76 and then the lift bags 68 are deflated to set the rack onto the rack support segments 78 of the lift carriage 76. The piston/cylinders 62 are retracted to pull the cart 50 back into the conveyor 20. The cart 50 can then be used to index the racks that have been pre-positioned on the conveyor 20 one position forward. That is, the rack in Zone two is moved into Zone one, the rack in Zone three is moved into Zone two, etc. When the last or end rack is moved forward, an additional rack can be loaded onto the second end of the conveyor 20.

In the other embodiment described above in which the carriage 56 is non-movably attached to the base 54, the drive assembly 40 could be movable, e.g., extensible and retractable, to permit the cart 50 to enter and leave the lift carriage 76. For example, the idler wheel 44 could be carried on an arm or similar structure and could be pivotable or movable to selectively extend or retract the idler wheel 44 and associated drive belt 46 into and out of the lift carriage 76. Alternatively, the drive assembly 40 could be mounted on a track and could be movable, e.g., extensible and retractable, into and out of the lift carriage 76.

Figure 7:
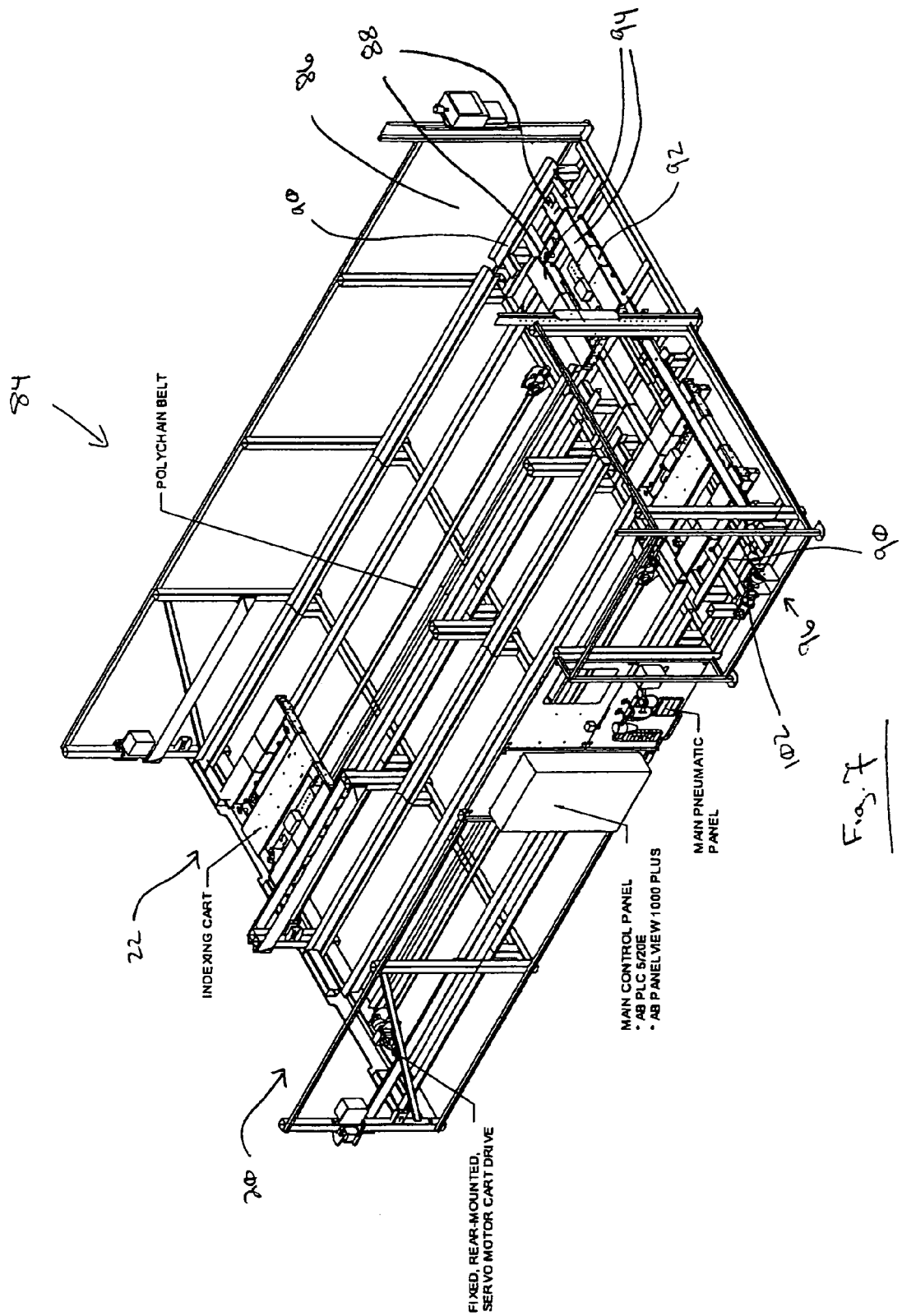
FIG. 7 is a perspective view of a side-by-side line feed system incorporating features of the invention.
Figure 8:
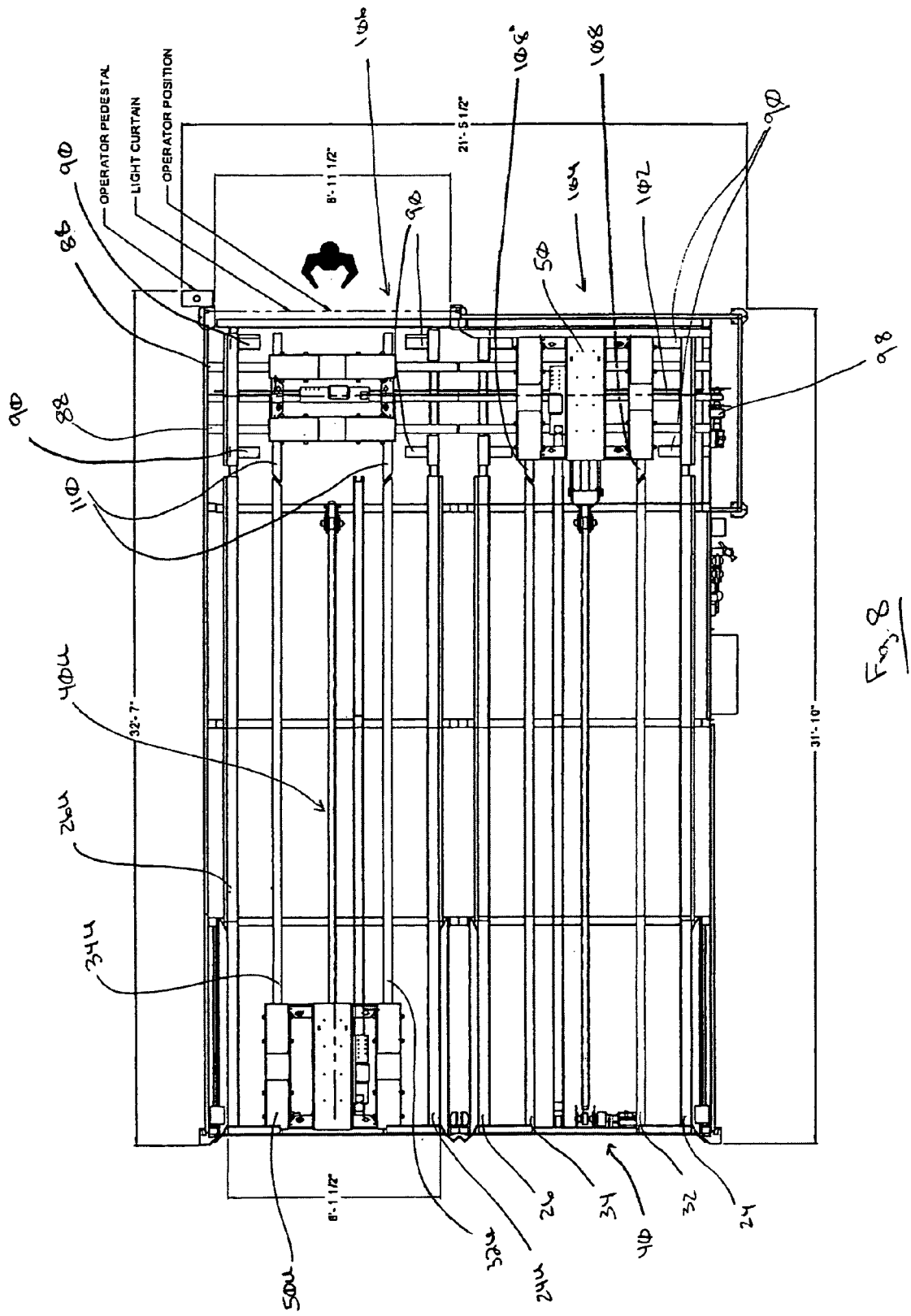
FIG. 8 is a plan view of the side-by-side line feed system of FIG. 7.

A side-by-side line feed system 84 is shown in FIGS. 7 and 8. The side-by-side line feed system 84 has a first conveyor 20 located adjacent a second conveyor 22. The first and second conveyors 20, 22 are similar to the conveyors of the over/under line feed system discussed above but are located side-by-side rather than one on top of the other. Similar components of the conveyors 20, 22 are identified by similar reference numbers as described above. However, the side-by-side line feed system 84 includes a transfer conveyor 86 located adjacent and substantially perpendicular to the first and second conveyors 20, 22. The transfer conveyor 86 includes a pair of spaced-apart transfer cart rails 88 and a plurality of transfer conveyor support rails 90. The transfer conveyor 86 includes a transfer cart 92 configured to engage and ride on the transfer cart rails 88. The transfer cart 92 can include a pair of spaced-apart lift assemblies 94 vertically movable as described above. However, the transfer cart 92 does not have the movable carriage arrangement described above. That is, the carriage of the transfer cart 92 can be connected directly to the base without the intervention of any piston/cylinder assemblies.

The transfer conveyor 86 further includes a drive assembly 96. In the illustrated embodiment, the drive assembly 96 is similar to the drive assemblies 40, 40U described above and includes a motor drive 98, an idler (not shown), and a flexible toothed belt 102 configured to extend around the motor drive 98 and idler, and engage the transfer cart 92 to move the transfer cart 92 along the transfer conveyor 86.

A first transfer station 104 is defined adjacent the first end of the first conveyor 20 and a second transfer station 106 is defined adjacent the first end of the second conveyor 22. The first transfer station 104 includes a pair of spaced-apart cart rail segments 108 and the second transfer station 106 includes a pair of spaced-apart cart rail segments 110.

Operation of the side-by-side line feed system 84 will now be described.

A rack having one or more parts is loaded onto the second end of the first conveyor 20. The first cart 50 is moved to the second end of the first conveyor 20 and lifts the rack off of the rack support rails 24, 26 as described above. The cart 50 is moved to the first end of the conveyor 20 and the pistons/cylinders 62 are extended to push the cart 50 and rack onto the cart rail segments 108 at a first transfer station 104. The pneumatic lift bags 68 are deflated to set the rack onto the support rail segments 90 at the first transfer station 104. The pistons/cylinders 62 are then retracted to pull the cart 50 back onto the cart rails 32, 34 where additional racks can be positioned on the first conveyor 20 as described above. The transfer cart 92 can be moved to the left (with respect to FIG. 7) and under the loaded rack at the first transfer station 104. The lift assemblies 94 on the transfer cart 92 are engaged to lift the rack from the rack support segments 90 at the first transfer station 104. The transfer cart 92 can then be moved to the right on the transfer cart rails 88 and into a second transfer station 106. The lift assemblies 94 are then deactivated to set the loaded rack onto the rack support segments 90 at the second transfer station 106. While the operator removes the parts from the rack at the second transfer station 106, the first indexing cart 50 can move another loaded rack into position at the first transfer station 104 and index one or more of the other loaded racks forward on the first conveyor 20.

When the rack at the second transfer station 106 is empty, the transfer cart 92 can be moved into the first transfer station 104 and the second conveyor cart 50U can remove the empty rack from the second transfer station 106. For example, the second cart 50U is moved to the first end of the second conveyor 22 and the pistons/cylinders 62 extended to push the second cart 50U onto the cart rail segments 110 in the second transfer station 106. The pneumatic lift bags 68 are activated to lift the empty rack off of the rack support segments 90 at the second transfer station 106 and then the pistons/cylinders 62 are retracted to pull the cart 50U and empty rack onto the second conveyor 22. The second cart 50U can then transfer the empty rack to the rear of the second conveyor 22 where it can be off loaded from the second conveyor 22. The transfer cart 92 can then be used to move another rack previously positioned at the first transfer station 104 by the first cart 50 into the second transfer station 106 for the operator to access the parts.

In another other embodiment similar to that described above for the over/under line feed system 10, the carriages 56, 56U can be non-movably attached to the bases 54, 54U and the drive assemblies 40, 40U could be movable, e.g., extensible and retractable, to permit the carts 50, 50U to enter and leave the first and second transfer stations 104, 106.

Figure 9:
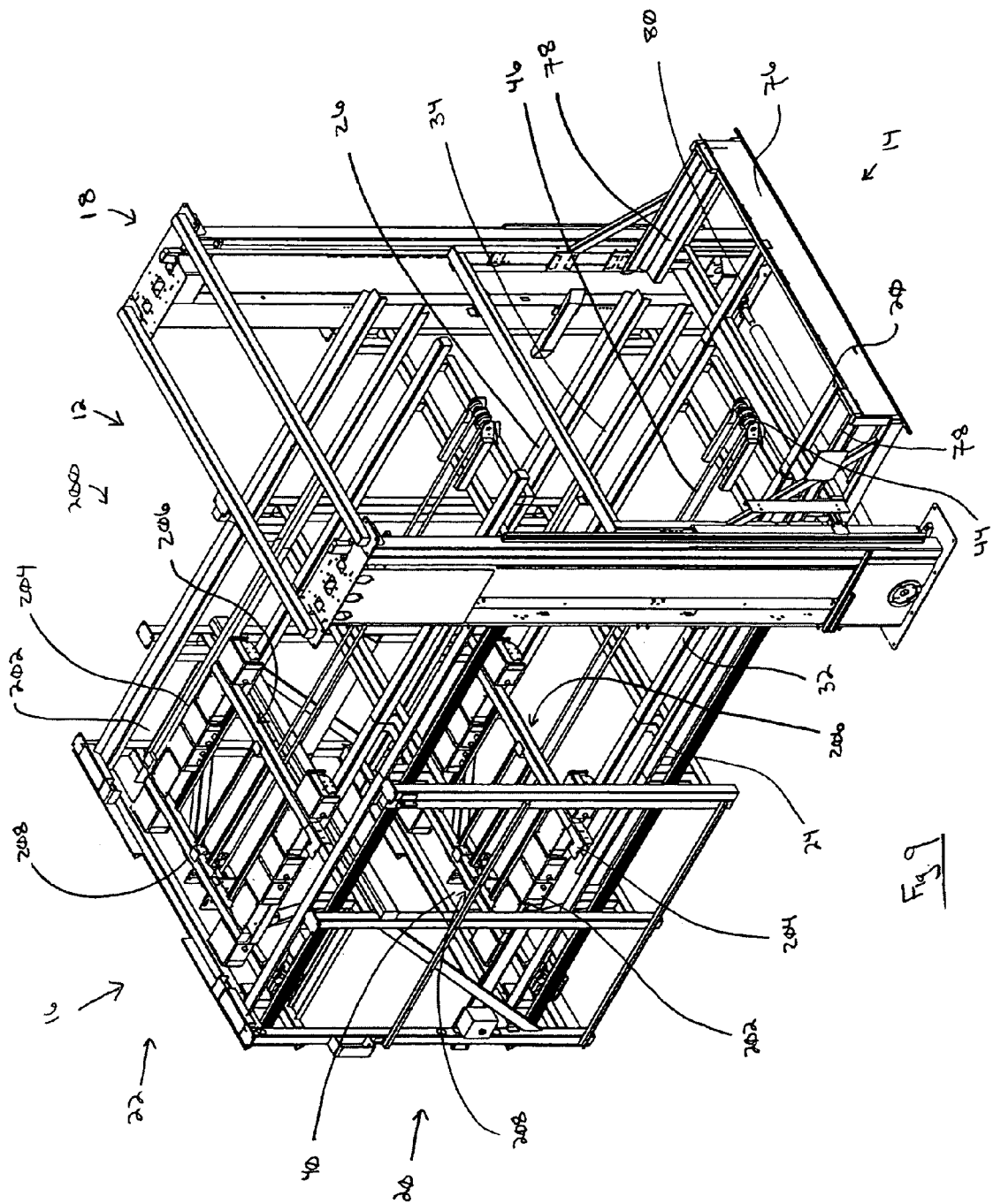
FIG. 9 is a perspective view of another line feed system of the invention.
Figure 10:
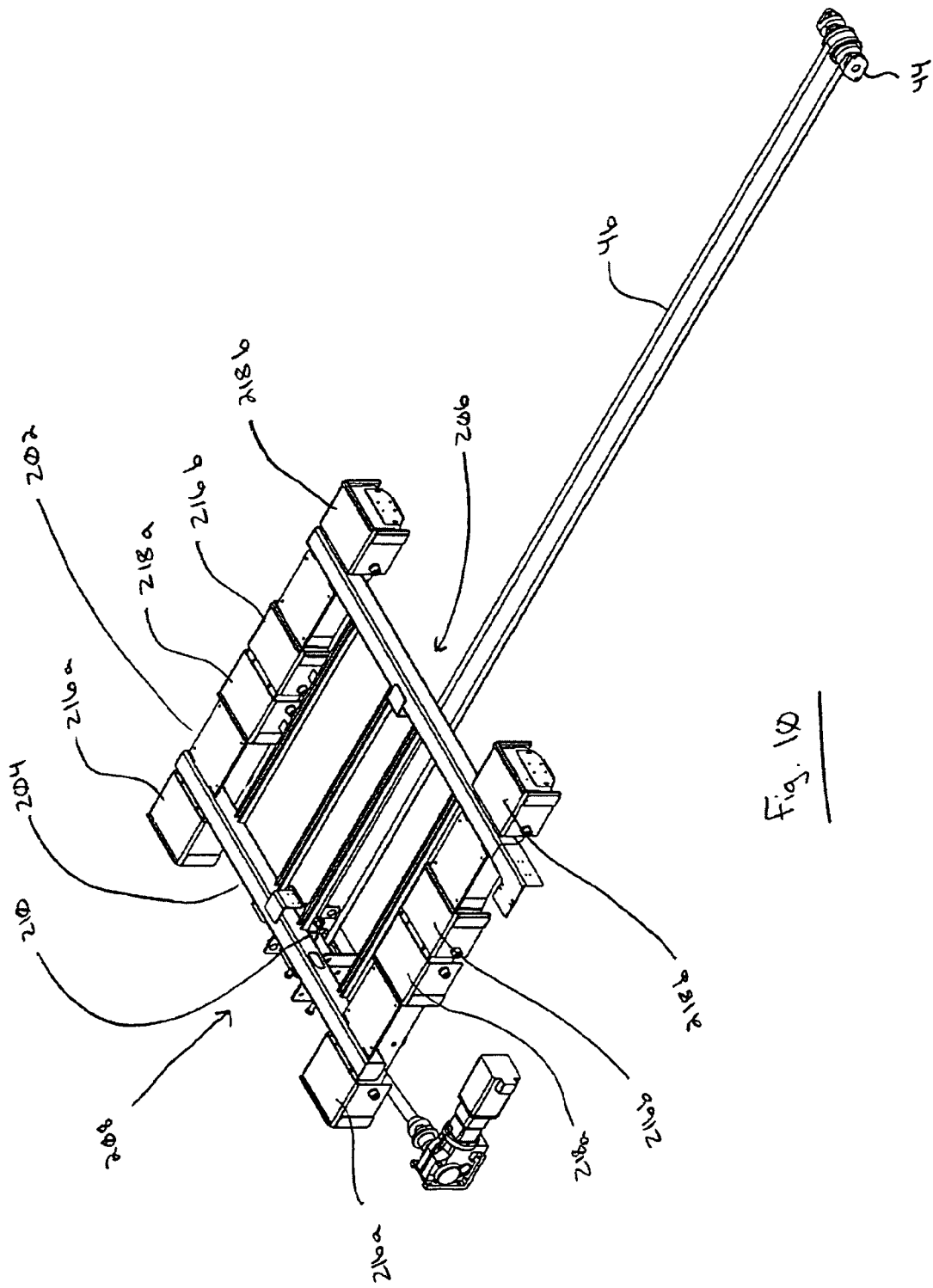
FIG. 10 is a perspective view of an indexing cart of the line feed system of FIG. 9.

Another exemplary over/under line feed system 200 is shown in FIG. 9. The line feed system 200 utilizes some components that are similar to those in the line feed system 10 shown in FIGS. 1-3 and discussed above. Therefore, like parts are identified by like reference numbers in FIG. 9. However, unlike the line feed system 10, the line feed system 200 utilizes a modified cart system. Specifically, the line feed system 200 has a cart 202 with a cart framework 204 having a front end 206 and a rear end 208. An engagement element 210 (FIG. 10) is located at or near the rear end 208 of the cart framework 204. The engagement element 210 can be, for example, a wheel, pulley, gear, or any similar conventional device configured to engage the drive belt 46 such that the cart 202 is movable along the cart rails 32, 34 by the drive assembly 40. Additionally, the cart 202 can include multiple lift assemblies on each side of the cart 202. For example, in the illustrated exemplary embodiment, the cart 202 has a set of first lift assemblies 216a and 216b located on each side of the cart 202 and also a set of second lift assemblies 218a, 218b on each side of the cart 202. The lift assemblies 216a, 216b, and 218a, 218b can be any conventional type of lift assembly, such as but not limited to the air bag lift assemblies discussed above. The first lift assemblies 216a, 216b and second lift assemblies 218a, 218b can be activated together or individually.

An alternative cart 224 for use with the line feed system 200 is shown in FIG. 11. In this embodiment, the cart 224 has a substantially rectangular base 226 and a carriage 228 movable, e.g., slidable, along the base 226. However, unlike the earlier example, the base 226 is longer than the carriage 228. Thus, the carriage 228 is slidable from a first, retracted position shown in FIG. 11 to a second, extended position in which the front 230 of the carriage 228 is at or adjacent the front 232 of the base 226. The carriage can be movable in any conventional manner. However, in the illustrated embodiment, the carriage is movable by one or more piston cylinders 234, 236. The cart 224 has lift assemblies 238 and 240 on each side. The lift assemblies 238 and 240 can be similar to the lift platforms 66 described above.

Operation of the line feed system 200 will now be described.

A rack can be positioned onto the rack support rails 24, 26 at the end of the lower conveyor 20 by a conventional fork lift truck. The cart 202 is moved by the drive assembly 40 to the second (rear) end 16 of the conveyor 20. Depending upon the position of the rack on the rack support rails 24, 26, the cart 202 is moved under the rack. A selected set of lift assemblies, such as 216a, 216b or 218a, 218b are activated to raise the rack off of the rack support rails 24, 26. The drive assembly 40 is then engaged to move the cart 202 (and the rack supported thereon) toward the front end 14 of the lower conveyor 20. In order to position the rack in the lift carriage 76, the drive assembly 40 can continue to operate to push the cart 202 into the lift carriage 76 on the cart rail segments 80. As will be appreciated from FIG. 9, as the cart 202 approaches the end of the conveyor 20, the cart 202 is moved into the lift carriage 76 since the engagement element 210 is at or near the rear end 208 of the cart 202. The lift assemblies 216a, 216b or 218a, 218b can then be deactivated to lower the rack onto the rack support segment 78 of the lift carriage 76. The drive assembly 40 can then be reversed to pull the cart 202 back into the framework 12. Thus, unlike the line feed system 10 described above, the cart 202 in this embodiment need not have an extensible and retractable carriage since the entire cart itself is movable into and out of the lift carriage 76. This simplifies the design of the cart drive system. Additionally, since the cart 202 has multiple sets of lift assemblies 216a, 216b and 218a, 218b on each side, the rack being moved can be positioned at selected positions along the conveyor 20.

The cart 224 (FIG. 11) could be used in the line feed system 200 instead of the cart 202 described above. With the cart 224, the engagement element 210 is attached at or near the rear of the base 226. The drive assembly 40 moves the cart 224 (base 226 and carriage 228) along the cart rails 32, 34. As the cart 224 approaches the front end 14 of the conveyor 20, the base 226 is pushed into the lift carriage 76 since the engagement element 210 is at or near the rear of the base 226. When the front end 232 of the base 226 is at or near the front end of the lift carriage 76, the carriage 228 can be moved forwardly on the base 226 by the piston cylinder assemblies 234, 236 to move the rack carried thereon into position in the lift carriage 76. The lift assemblies 238, 240 on the cart 224 can then be lowered to position the rack in the lift carriage 76.

Another side-by-side line feed system 300 is shown in FIG. 12. The line feed system 300 is similar in structure and operation to the line feed system 84 shown in FIGS. 7 and 8 and similar components are identified by similar reference numbers. However, in the line feed system 300, the idler wheels 44 are positioned to permanently extend beyond the front end of the conveyors 20 and 22. That is, the idler wheels 44 can be carried on supports 302 that extend into the area of the transfer conveyor 86. The transfer cart rails 88 can be positioned closer to the operator station (that is farther to the right in FIG. 12) such that the idler wheels 44 (or supports 302) do not interfere with movement of the transfer cart 92. The idler wheels 44 can also be positioned below the level of the bottom of the transfer cart 92 to prevent interference with operation of the transfer cart 92. Therefore, in the line feed system 300, there is no need to use any extension or movement devices on the carts 304, 306, i.e., to extend the cart carriage from the cart base, or to extend or retract the idler wheels 44. The carts 304, 306 can be similar to the cart 202 with an engagement element 210 located at or near the rear end of the carts 304, 306. Since the idler wheels 44 are permanently and non-movably mounted forward of the front end of the conveyors 20, 22, when the carts 304, 306 are moved to their forward-most position, the carts 304, 306 extend a sufficient distance into the transfer stations 104, 106 to allow the racks to be properly positioned in the transfer stations 104, 106.

It will be readily appreciated by those skilled in the art that modifications may be made to the invention without departing from the concepts disclosed in the foregoing description. For example, in the exemplary embodiments described above, the loaded racks were delivered by the first conveyor and the empty racks removed by the second conveyor. However, it is to be understood that the loaded racks could alternatively be delivered by the second conveyor and the empty racks removed by the first conveyor. Accordingly, the particular embodiments described in detail herein are illustrative only and are not limiting to the scope of the invention, which is to be given the full breadth of the appended claims and any and all equivalents thereof.

What is claimed is:

1. An over/under line feed system, comprising:
   a framework having a first end and a second end;
   a first conveyor located under a second conveyor on the framework, wherein each conveyor includes:
      a pair of spaced rack support rails; and
      a pair of spaced cart support rails, wherein the cart support rails are lower than the rack support rails;
   a first drive system associated with the first conveyor and a second drive system associated with the second conveyor;
   a first cart movable along the first conveyor and a second cart movable along the second conveyor, wherein each cart includes:
      a base configured to engage a respective drive system;
      a carriage connected to the base by an extensible and retractable movement device; and
      at least one lift platform mounted on the carriage and vertically movably by at least one lift device; and
   an elevator assembly located adjacent the first end of the framework, the elevator assembly including a vertically movable lifting carriage, wherein the lifting carriage includes a pair of rack support segments and a pair of cart rail segments that align with the rack support rails and the cart support rails, respectively, when the lifting carriage is positioned at the first end of one of the conveyors,
   wherein the base of each cart is movable between the first end and the second end of the framework, and wherein the carriage is extensible beyond the first end of the framework and into the lifting carriage of the elevator onto the cart support rails when the lifting carriage is adjacent the first end of one of the conveyors.

2. The line feed system of claim 1, wherein the framework is a rigid framework.

3. The line feed system of claim 1, wherein the framework is an adjustable framework.

4. The system of claim 1, wherein the drive system comprises a motor, an idler spaced from the motor, and a flexible drive member engaging the motor and the idler.

5. The system of claim 1, wherein the movement device comprises at least one piston/cylinder.

6. The system of claim 1, wherein the lift device comprises a pair of spaced air bags.

* * * * *